US012485692B2

(12) United States Patent
Martini

(10) Patent No.: US 12,485,692 B2
(45) Date of Patent: Dec. 2, 2025

(54) METHOD AND APPARATUS FOR SEWING BOOK BLOCKS WITHOUT BLIND STITCH BY MEANS OF HOOKS

(71) Applicant: MECCANOTECNICA S.P.A., Gazzaniga (IT)

(72) Inventor: Paolo Martini, Torre Boldone (IT)

(73) Assignee: MECCANOTECNICA S.P.A., Gazzaniga (IT)

( * ) Notice: Subject to any disclaimer, the term of this patent is extended or adjusted under 35 U.S.C. 154(b) by 214 days.

(21) Appl. No.: 18/547,559

(22) PCT Filed: Jan. 31, 2022

(86) PCT No.: PCT/EP2022/052180

§ 371 (c)(1),
(2) Date: Aug. 23, 2023

(87) PCT Pub. No.: WO2022/179800

PCT Pub. Date: Sep. 1, 2022

(65) Prior Publication Data

US 2024/0066906 A1 Feb. 29, 2024

(30) Foreign Application Priority Data

Feb. 25, 2021 (IT) ........................ 102021000004490

(51) Int. Cl.
*B42B 2/04* (2006.01)
*B42B 2/08* (2006.01)

(52) U.S. Cl.
CPC . *B42B 2/04* (2013.01); *B42B 2/08* (2013.01)

(58) Field of Classification Search
CPC ... B41F 13/64; B42B 2/02; B42B 2/04; B42B 2/08; B65H 5/32; B65H 2301/435; B65H 2301/436

(Continued)

(56) References Cited

U.S. PATENT DOCUMENTS 1,902,864 A 3/1933 Kleinschmit
1,974,787 A 9/1934 Verd
(Continued)

FOREIGN PATENT DOCUMENTS

CN 101058268 B 6/2012
CN 101337478 B 4/2015
(Continued)

OTHER PUBLICATIONS

International Search Report and Written Opinion dated May 25, 2022, for corresponding International Application No. PCT/EP2022/052180.

(Continued)

*Primary Examiner* — Leslie A Nicholson, III

(74) *Attorney, Agent, or Firm* — Bryan A. Santarelli; FisherBroyles, LLP

(57) ABSTRACT

An embodiment is proposed for sewing book blocks. A related embodiment comprises, for each book block, forming one or more stitchings with corresponding threads ending with corresponding free loops on a last signature of the book block. The threads are brought in line with corresponding free loops and thus through them along an advancement line of the signatures. The threads are moved away from the free loops by means of corresponding hooks, with the threads sliding relative to the hooks in this phase, thereby tightening each free loop around its thread. After that, the threads are cut. A related bookbinding sewing machine and a related bookbinding plant are also proposed.

16 Claims, 8 Drawing Sheets

(58) Field of Classification Search
USPC ....... 412/35; 270/58.08, 52.16, 52.17, 52.18, 270/52.29
See application file for complete search history.

(56) References Cited

U.S. PATENT DOCUMENTS

| | | | | |
|---|---|---|---|---|
| 5,507,524 | A * | 4/1996 | Botschi | B42B 2/04 281/27 |
| 5,678,813 | A * | 10/1997 | Osako | B65H 5/32 412/37 |
| 5,984,603 | A * | 11/1999 | Boetschi | B42B 2/00 412/35 |
| 10,946,687 | B2 * | 3/2021 | Maffeo | B42B 2/08 |
| 12,103,326 | B2 * | 10/2024 | Madaschi | B42B 2/02 |
| 2019/0255871 | A1 * | 8/2019 | Maffeo | B42B 2/02 |

FOREIGN PATENT DOCUMENTS

| | | | |
|---|---|---|---|
| CN | 102259520 | B | 4/2015 |
| CN | 208069151 | U | 11/2018 |
| CN | 209683235 | U | 11/2019 |
| CN | 109311340 | B | 11/2020 |
| EP | 0832758 | A2 | 4/1998 |
| EP | 1477322 | A | 11/2004 |
| EP | 1557284 | B1 | 6/2006 |
| EP | 3439893 | A2 | 2/2019 |
| GB | 14577 | A | 12/1911 |
| IT | 9020682 | | 6/1990 |
| IT | MI20030945 | A1 | 11/2004 |
| IT | MI20100477 | A1 | 9/2011 |
| IT | 201600076770 | A1 | 1/2018 |
| WO | 2018015916 | A | 1/2018 |

OTHER PUBLICATIONS

First Office Action issued Jul. 7, 2025 for CN Application No. 202280016355.2, a counterpart application of U.S. Appl. No. 18/547,559, 11 pgs.

First Office Action issued Jul. 7, 2025 for TW Application No. 111106459, a counterpart application of U.S. Appl. No. 18/547,559, 8 pgs.

* cited by examiner

METHOD AND APPARATUS FOR SEWING BOOK BLOCKS WITHOUT BLIND STITCH BY MEANS OF HOOKS

RELATED APPLICATION DATA

The present application is a U.S National Stage under 35 U.S.C 371 of International Application No. PCT/EP2022/052180, filed on 31 Jan. 2022; which claims priority to IT Patent Application No. 102021000004490, filed 25 Feb. 2021, the entirety of which is incorporated herewith.

TECHNICAL FIELD

The present disclosure relates to the bookbinding field. More specifically, this disclosure relates to the sewing of book blocks without blind stitch.

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Signatures are commonly sewn together into blocks (in bookbinding sewing machines), so as to obtain book blocks for the production of corresponding books (of sewn type); for this purpose, stitchings are formed by means of corresponding (sewing) threads between the signatures of each book block, by using one or more needles and crochets; particularly, the stitchings comprise rows of plain stiches (formed by the needles) and rows of looped stitches (formed by the crochets), which plain stiches and looped stitches are concatenated to each other. Once a last signature of the book block has been sewn, the loops just formed are released from the hooks and the threads are cut so as to separate the book block. Therefore, in each book block the stitchings finish at the free ends of the (cut) threads with corresponding free tails on a first signature (at the beginning of the plain stitches) and with corresponding free loops on the last signature (at the end of the looped stitches).

However, the free loops may return into the last signature. When this happens, the corresponding stitchings (whose withstanding is mainly provided by the looped stitches) loosen thereby compromising compactness and integrity of the book block during its next processing steps (with the corresponding signature that may easily slide with respect to the rest of the book block up to detach). Therefore, a blind stitch without any signature is typically made after sewing the last signature. In this way, each thread (before being cut) is inserted into the corresponding free loop and the free loop is tightened around the thread so as to prevent the free loop from returning into the last signature. However, the making of the blind stitches reduces the performance of the sewing machines, since it requires an idle cycle (i.e., wherein no signature is sewn) at the end of each book block. This is particularly evident in the production of small books (for example, books for children), wherein each book block is formed by a reduced number of signatures, since the ratio between the idle cycles and the operating cycles (wherein the signatures are sewn) is very high (for example, 25-33% for book blocks formed by 4-3 signatures, respectively).

Several techniques have been proposed over time for avoiding making the blind stitches.

For example, for this purpose it is possible to apply glue between the last two signatures of each book block (on a scrap portion thereof) or to use threads impregnated with glue. However, the use of the glue may get various members of the sewing machine dirty and it may hinder the complete opening of the books. Moreover, it is possible to anchor every free loop to the book block or to the rest of its stitching by fusing the corresponding thread for welding it thereto. However, this requires the use of special threads (with a high content of synthetic fibers), with a negative impact on the operating costs of the sewing machines (and therefore of the books produced by them). It is also possible to exploit a transversal widening of each thread outside the last signature (for example, by forming a knot or using a pre-knotted thread) for hindering the thread from returning into the last signature.

EP-A-1477322 instead proposes tightening the free loops around the threads while a movable saddle (used for feeding the signatures to be sewn in succession) opens to receive a first signature of a next book block; for this purpose, for each thread the crochet rotates the free loop by 90° and an auxiliary crochet hooks the thread close to the needle and pulls it within the (rotated) free loop, after which the thread is cut.

WO-A-2018/015916 proposes a different technique based on the use of corresponding gripping devices, or thread-clamps (capable of gripping and blocking the threads). For this purpose, for each thread a shuttle brings it to an intermediate position aligned with the corresponding free loop (along an advancement line of the signatures during their sewing). The thread-clamp brings the thread from the intermediate position through the free loop. The thread-clamp is actuated to block the thread, which is then cut. At this point, the thread-clamp pulls the (cut) thread transversally to the advancement line, so as to tighten the free loop around it.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of using hooks.

Particularly, an aspect provides a method for sewing book blocks. The method comprises, for each book block, forming one or more stitchings with corresponding threads ending with corresponding free loops on a last signature of the book block. The threads are brought in line with corresponding free loops and thus through them along an advancement line of the signatures. The threads are moved away from the free loops by means of corresponding hooks, with the threads sliding relative to the hooks in this phase, thereby tightening each free loop around its thread. After that, the threads are cut.

A further aspect provides a corresponding bookbinding sewing machine.

A further aspect provides a bookbinding plant comprising one or more such bookbinding sewing machines.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, such as value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. Particularly.

DETAILED DESCRIPTION

Figure 1:
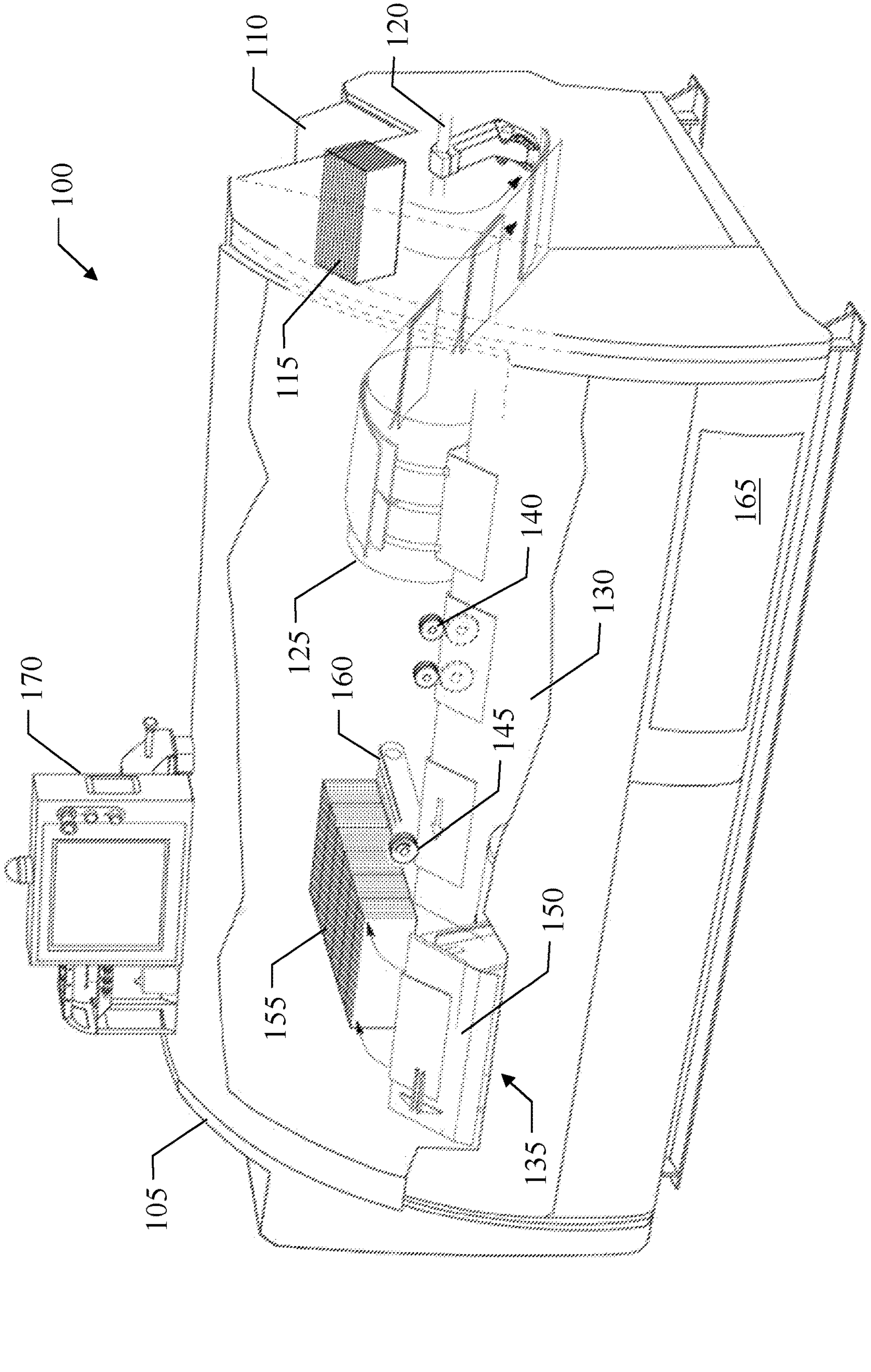
FIG. 1 shows a pictorial representation of a bookbinding sewing machine wherein the solution according to an embodiment of the present disclosure may be applied.

With reference in particular to FIG. 1, a pictorial representation is shown of a (bookbinding) sewing machine 100 wherein the solution according to an embodiment of the present disclosure may be applied.

The sewing machine 100 is used for sewing signatures to each other, so as to form book blocks for the production of corresponding books of sewn type in a bookbinding plant (not shown in the figure); for example, each signature is formed by a printed sheet, which is folded one or more times to define different pages of the books.

The sewing machine 100 comprises a bearing frame 105 for its components, which is provided with a carter for covering them. Particularly, a hopper 110 is used to load a stack of signatures to be sewn, denoted with the reference 115 (ordered according to the book blocks to be formed). An extraction device 120 extracts the signatures 115 in succession from the bottom of the hopper 110 and provides them to an opening device 125; in turn, the opening device 125 opens each signature 115 and places it astride a fixed saddle 130. The fixed saddle 130 conveys the signatures 115 to a sewing station 135. In detail, the signatures 115 cross a shaping station 140 and then reach a launching wheel 145, which accelerates each signature 115 so as to separate it from the previous ones and throw it individually over a movable saddle 150 of the sewing station 135 (in an open position aligned with the fixed saddle 130). Once the signature 115 has been loaded astride the movable saddle 150, the latter is raised to bring it towards a closed position under a sewing head (not shown in the figure); the sewing head sews the signature 115 loaded on the movable saddle 150 by continuous (sewing) threads, starting a new book block if the signature 115 is the first one thereof or adding the signature 115 to a book block under formation otherwise; the movable saddle 150 then returns to the open position (by slipping out of the signature 115 just sewn) to repeat the same operations continually. As soon as each book block is completed, the threads are cut to separate it therefrom. The book blocks so obtained, denoted with the reference 155, are deposited in succession onto an output conveyor 160 (to be provided to further bookbinding machines, not shown in the figure, which complete the corresponding books). A motor 165 drives the various (mechanical) members of the sewing machine 100 by means of corresponding transmission systems (not visible in the figure). Operation of the entire sewing machine 100 is managed by a control system 170 (for example, based on an industrial PC).

Figure 2:
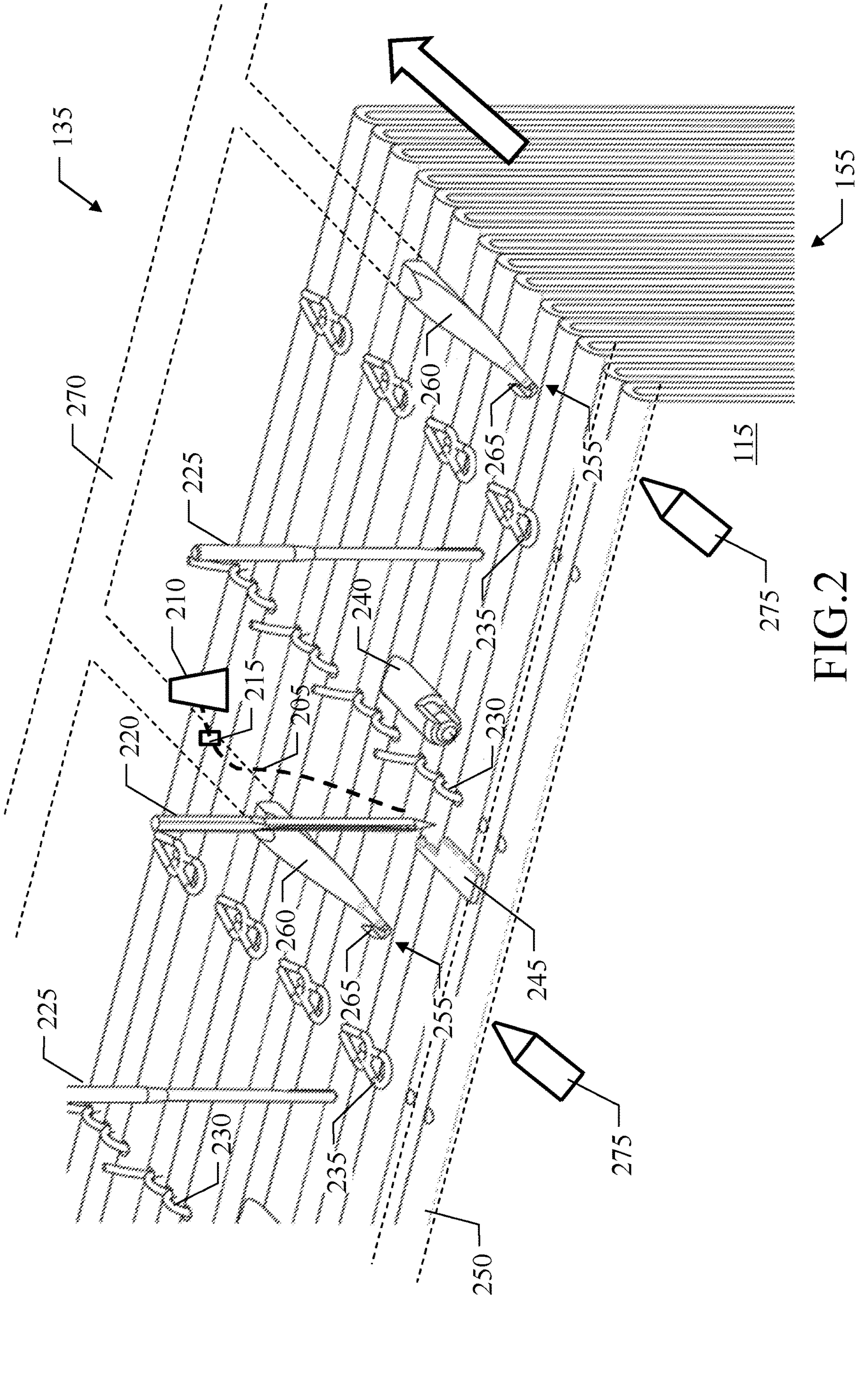
FIG. 2 shows a simplified representation of a portion of the bookbinding sewing machine according to an embodiment of the present disclosure.

With reference now to FIG. 2, a simplified representation is shown of a portion of the sewing machine according to an embodiment of the present disclosure.

Particularly, the sewing station 135 comprises the following components. The threads, denoted with the reference 205, being used to sew the signatures 115 of the book blocks 155 are supplied continuously by corresponding spools 210 (for example, 8-15). Each spool 210 comprises a cone-shaped reel on which the corresponding thread 205 is wound, so as to be free to unwind from it in a regular manner. A device for locking the thread, or thread-lock 215 selectively locks the unwinding of the thread 205 from the spool 210. One or more needles 220 and one or more crochets 225 are alternated to each other. Each needle 220 is formed by a stem which ends with a tip provided with an eye for inserting a corresponding thread 205 supplied by its spool 210. Each crochet 225 is formed by a similar stem that instead ends with a hook facing upwards for hooking the threads 205 provided by the needles 220; particularly, in a normal stitching technique each needle 220 always supplies its thread 205 to a corresponding adjacent crochet 225 (for example, from a head to a foot of the signatures 105, towards the right in the figure), while in a staggered stitching technique each needle 220 alternately supplies its thread 205 to a previous crochet 225 and to a following crochet 225 (to the left and to the right, respectively, in the figure), with the exception of a first needle 220 and a last needle 220 that alternately skip this operation due to the lack of the previous crochet and of the following crochet, respectively. The needles 220 and the crochets 225 cooperate to convey the threads 205 through each signature 115 loaded on the movable saddle (not shown in the figure), so as to form one or more stitchings bridging between the signatures 115 of each book block 155. The stitchings comprise a row of one or more plain stitches 230 formed by each needle 220 and a row of one or more looped stitches 235 formed by each crochet 225; particularly, in the normal stitching technique the plain stitches 230 formed by each needle 220 are concatenated with the looped stitches 235 formed by the corresponding crochet 225, whereas in the staggered stitching technique the plain stitches 230 formed by each needle 220 are concatenated alternately with the looped stitches 235 formed by the two adjacent crochets 225 (where present). The needles 220 and the crochets 225 are mounted on a support bar (not shown in the figure) arranged above the movable saddle in its closed position, which support bar implements a mechanism of translation up/down of the needles 220 and the crochets 225 and of rotation around their longitudinal axes of the crochets 225. Corresponding cutters 240 are associated with the needles 220 for cutting their threads 205. For example, each cutter 240 is of the active type with a telescope structure (with an internal rod sliding with respect to an external bush). Each cutter 240 is arranged between the needle 220 and the corresponding crochet 225 that is used to sew the last signature 115 of each book block 155 (for example, towards the foot of the signatures 105, to the right in the figure). The cutters 240 are mounted on a support bar (not shown in the figure) which implements a driving mechanism thereof.

The sewing station 235 sews the signatures 115 as usual during corresponding sewing cycles (each defined by an operating cycle of the sewing machine given by a complete rotation of a transmission shaft of its motor). In short, once each signature 115 (loaded on the movable saddle) has been sewn to a previous signature 115 of the corresponding book block 155, the needles 220 and the crochets 225 are raised above it. Each thread 105 extends from the spool 210 to the previously formed stitching 230,235, passing through the corresponding needle 220 and other members of the sewing station 135, not shown in the figure, such as a corresponding sewing head segment, with a free loop thereof that is held by an adjacent crochet 225. The movable saddle is open to load a next signature 115 to be sewn, with the signature 115 just sewn that slips out of it. The movable saddle is then closed to bring the (next) signature 115 under the needles 220 and the crochets 225, with all the signatures 115 already sewn that advance along an advancement line and in an advancement direction thereof during their sewing, outwards of the sewing machine (as indicated by a corresponding arrow in the figure). The needles 220 and crochets 225 (with their hooks facing in the opposite direction to the advancement direction of the signatures 115) are lowered so as to enter the signature 115 to be sewn (through corresponding holes formed by perforators arranged inside the movable saddle, not visible in the figure). Consequently, each thread 205 is unwound from the spool 210 (with the thread-lock 215 being deactivated) and pushed into the signature 115 by the needle 205, while each loop remains wound around the crochet 225 outside the signature 115.

Each thread 205 inside the signature 115 is brought from the needle 220 to a corresponding crochet 225 (the one which holds the loop formed by the same thread 205 in the normal stitching technique or the other adjacent one, if present, which holds the loop formed by another thread 205 in the staggered stitching technique) further unwinding from the spool 210, for example, by means of a corresponding shuttle (not visible in the figure). The needles 220 and the crochets 225 are raised so as to exit the signature 115, with the thread-locks 210 that are then activated to prevent further unwinding of the threads 205 from the spools 210; in this phase, each crochet 225 hooks the thread 205 being brought thereto and extracts it from the signature 115 so as to form a new loop that is concatenated with the previous loop that is released by the crochet 205 (at the same time pulling the thread 205 so as to tighten the previous loop around the new loop for closing the corresponding looped stitch 235). The same operations are repeated until the corresponding book block 155 is formed, with all its signatures 115 having been sewn. At this point, during the sewing cycle of a first signature 115 of a next book block 155, the crochets 225 are lowered to enter it with their hooks facing in the same direction as the advancement direction of the signatures 115, so as to lose the corresponding loops. Subsequently, the cutters 240 are activated to cut the threads 205, so as to separate the book block 155 from them (and therefore from any next book blocks 155).

In the solution according to an embodiment of the present disclosure, the signatures 115 are sewn seamlessly between the book blocks 155 (i.e., with all the sewing cycles corresponding to the processing of a batch of signatures 115 each involving the sewing of a signature 115, with no blind stitches at the end of the book blocks). For this purpose, the sewing station 135 comprises the following further components.

Corresponding (auxiliary) shuttles 245 are associated with the needles 220; each shuttle 245 is used to bring the thread 205 (outside the movable saddle) from its needle 220 to a corresponding crochet 225 that holds the free loop formed by the same thread 205 on the last signature 115 of each book block 155 (for example, towards the foot of the signatures 115, to the right in the figure). The shuttles 245 are mounted on a support bar 250 arranged above the movable saddle in its closed position (slightly below the needles 220 and the crochets 225), so that in rest condition each shuttle 245 is beside its needle 220 (transversely to the advancement line of the signatures 115) on the opposite side of the corresponding crochet 225 (on the left in the example at issue); the support bar 250 implements a mechanism of translation of the shuttles 245 horizontally, obliquely to the advancement line of the signatures 115 (as the crow flies). Corresponding hooks 255 are associated with the crochets 225; each hook 255 is used to catch and pull (without blocking it) the corresponding thread 205 through the free loop held by the crochet 225. The hook 255 has a main body 260 with a tapered shape (for example, generally conical). Particularly, the main body 260 widens in the advancement direction of the signatures 115, and then narrows in the opposite direction ending with a tip (in front in the figure); a catch 265 is provided at the tip of the main body 260, facing the advancement direction of the signatures 115. The hooks 255 are mounted on a support bar 270 arranged above the movable saddle in its closed position (slightly below the crochet 225), so that in rest condition each hook 255 is slightly downstream of the corresponding crochet 225 along the advancement direction of the signatures 115 (behind in the figure), displaced laterally on the opposite side of the corresponding needle 220 (on the right in the example at issue); the support bar 270 implements a mechanism of translation horizontally, in parallel and transversely to the advancement line of the signatures 115. One or more blowers 275 are used to blow the sewing threads 205 wound on the hooks 255 in the advancement direction of the signatures 115. For example, the blowers 275 are implemented by means of corresponding nozzles associated with the hooks 255, which nozzles are connected to a common compressor for supplying air jets; the nozzles are arranged in proximity of the hooks 255 in their rest position, upstream thereof along the advancement direction of the signatures 115 (in front in the figure).

With reference to FIG. 3A-FIG. 3F, the main steps are shown of the completion of the book blocks without blind stich according to an embodiment of the present disclosure.

Figure 3A:
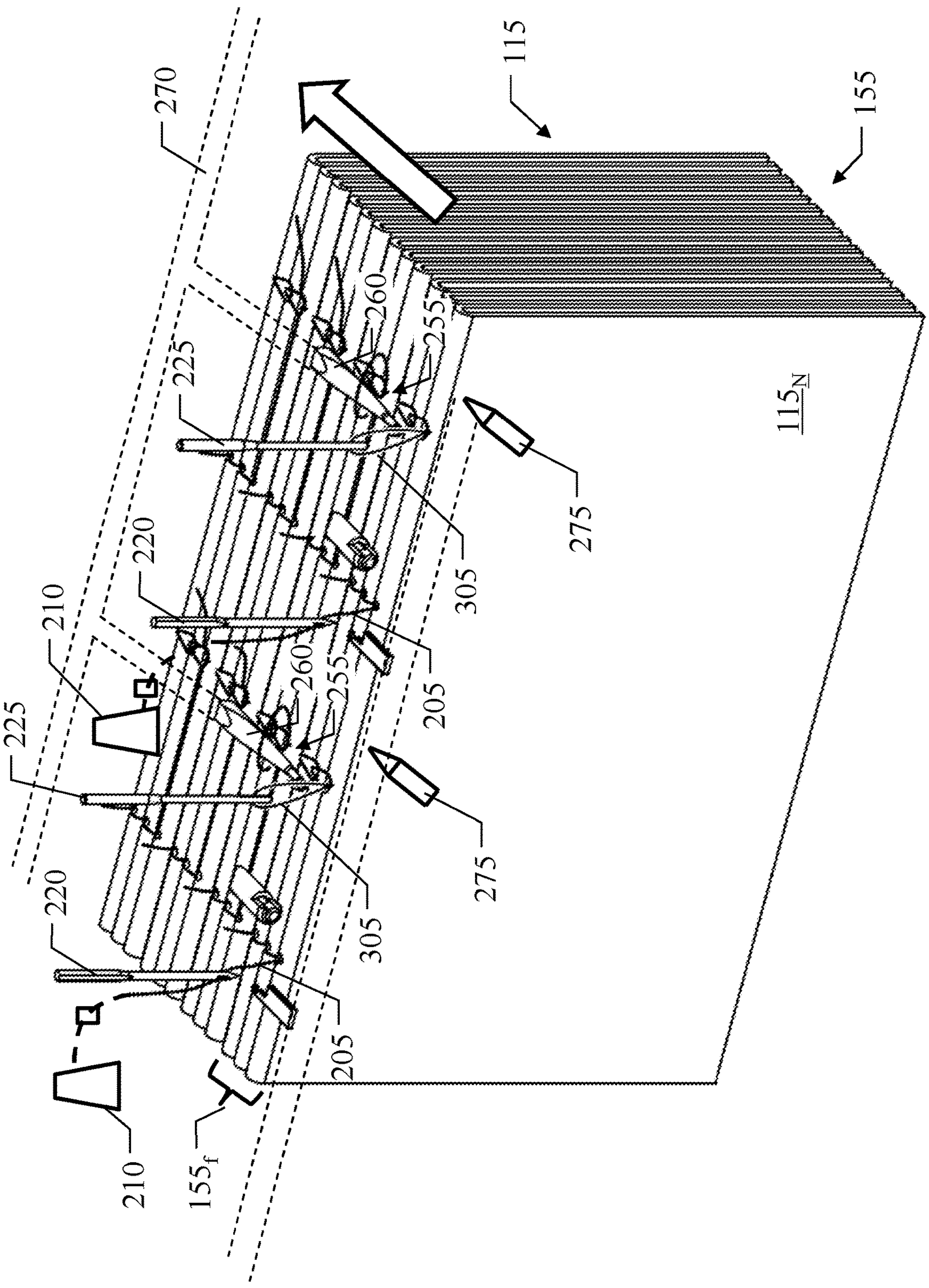
FIG. 3A-FIG. 3F show the main steps of the completion of the book blocks without blind stich according to an embodiment of the present disclosure.

Starting from FIG. 3A, the situation is shown wherein a (current) book block, differentiated with the reference 155$_f$, has just been formed with the sewing of its last signature, differentiated with the reference 115$_N$ (third one in the example at issue). In this situation, the stitchings end with one or more free loops 305 on the (last) signature 115$_N$; particularly, each free loop 305 is held by a corresponding crochet 225 outside the signature 115$_N$, with its thread 205 that enters the signature 115$_N$ again, exits from it at the corresponding needle 220 (on the left in the example at issue) and passes through its eye until reaching the corresponding spool 210. At this point, the support bar 270 translates the hooks 255 transversely to the advancement line of the signatures 115 from their rest position towards the corresponding crochets 225 (to the left in the figure). In this way, each hook 255 moves into an operative position, aligned with the crochet 225 downstream thereof along the advancement direction of the signatures 115 (behind in the figure). Consequently, the threads 205 of the previous book blocks 155 that are wrapped around each hook 255 (as described in the following) loosen. Therefore, the blowers 275 are activated so as to blow these threads 205 towards the widest part of the main bodies 260 of the hooks 255, so as to keep them taut thereon. This prevents the threads 205 from being lost from the hooks 255, especially in the case of book blocks 155 formed by a small number of signatures 115, wherein the threads 205 (pulled in the advancement direction of the signatures 115 and therefore towards the widest part of the main bodies 260 during the formation of the book blocks 155) are arranged relatively close to the free end of the main bodies 260.

Figure 3B:
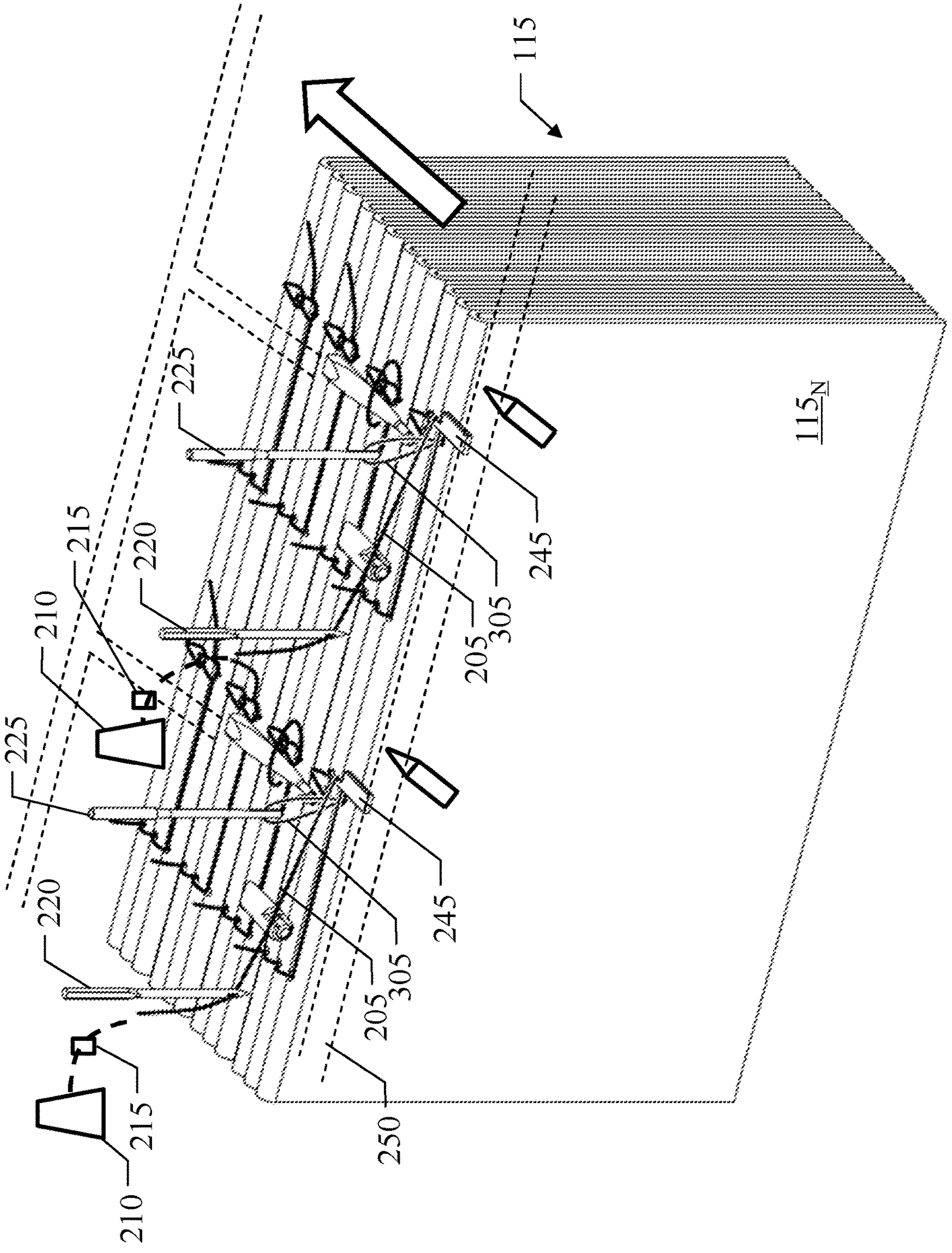

Moving to FIG. 3B, the support bar 250 translates the shuttles 245 obliquely to the advancement line of the signatures 115 (as the crow flies) from their rest position beyond the corresponding crochet 225 (to the right in the figure), for example, passing them by 1-3 mm, upstream thereof along the advancement direction of the signatures 115 (in front in the figure). In this way, each shuttle 245 catches the corresponding thread 205 between the signature $\mathbf{115}_N$ and the needle 220; the shuttle 245 then pulls the thread 205 drawing it from the spool 210 (with the thread-lock 215 being deactivated) for bringing it into a catching position aligned with the free loop 305, upstream thereof along the advancement direction of the signatures 115 (in front in the figure), for example, at a distance of 1-3 mm from it; during this movement of the shuttle 245, the thread 205 slides with respect thereto so as to tighten a lower portion thereof between the signature $\mathbf{115}_N$ and the shuttle 245 and an upper portion thereof between the shuttle 245 and the needle 220. A displacement of the thread 205 from the needle 220 to the catching position extends as the crow flies in a direction that forms an angle higher than 90° with the advancement direction of the signatures 115 (such as of the order of 95°-125°, preferably 100°-120° and still more preferably 105°-115°, like 110°); for example, this result may be achieved with a movement of the shuttle 425 along an S-shaped path, i.e., perpendicular to the advancement line, along the advancement line in the opposite direction to the advancement direction and then again perpendicular to the advancement line of the signatures 115.

Figure 3C:
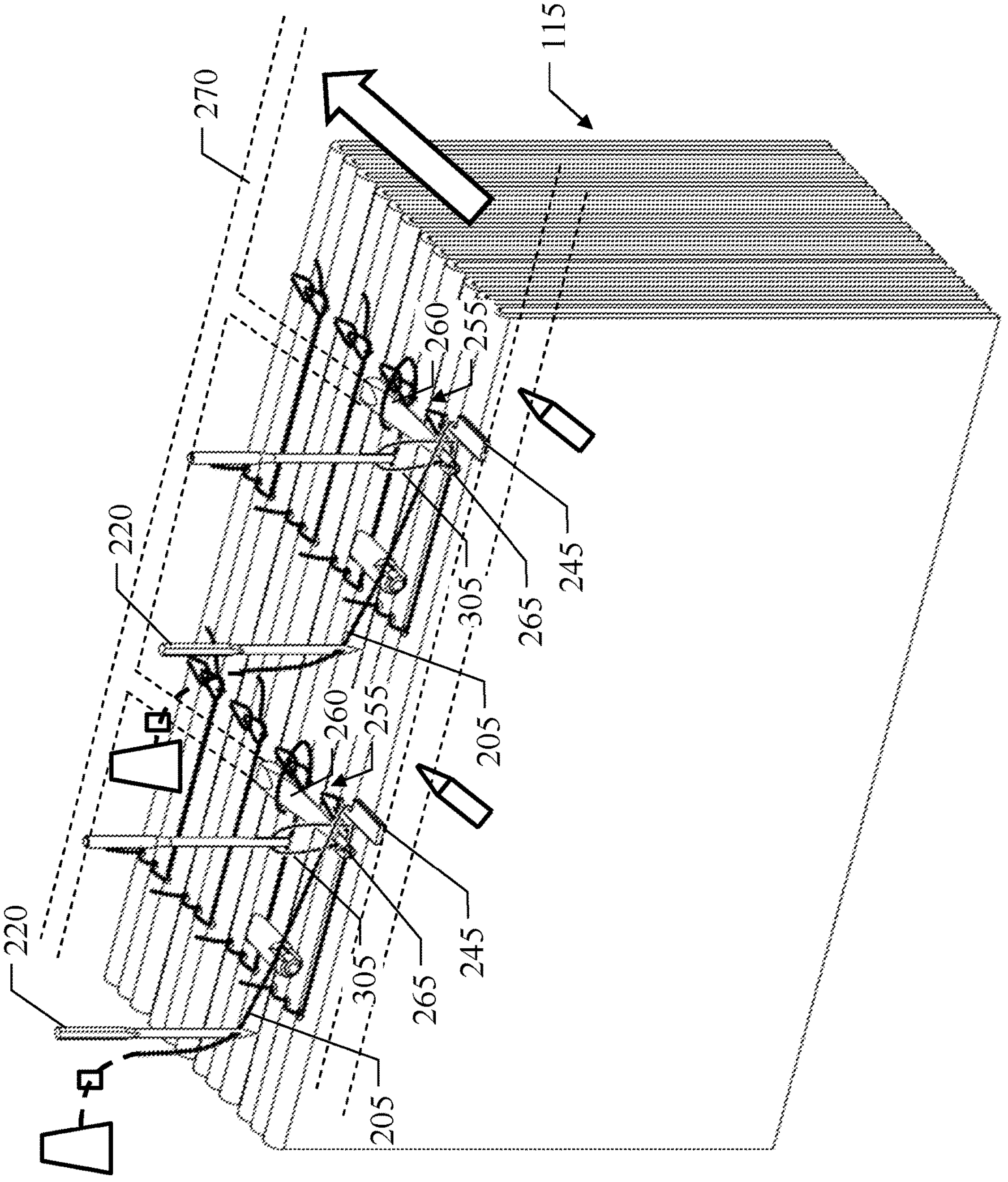

Moving to FIG. 3C, the support bar 270 translates the hooks 255 in the opposite direction to the advancement direction of the signatures 115. In this way, each hook 255 is brought through the free loop 305 to catch the thread 205 (previously brought to the other part of the free loop 305, in front in the figure, by the shuttle 245). Particularly, the hook 255 slips into the free loop 305 (operation facilitated by the tip of its main body 260). When the hook 255 reaches the upper portion of the thread 205 (tightened between the shuttle 245 and the needle 220), its catch 265 raises the thread 205 above it; as soon as the catch 265 has passed the thread 205, the catch 265 clears the thread 205 that returns elastically into its previous position by resting onto the main body 260, behind the catch 265 (with the hook 255 still advancing slightly, for example, by 1-3 mm, to guarantee this result in all operating conditions).

Figure 3D:
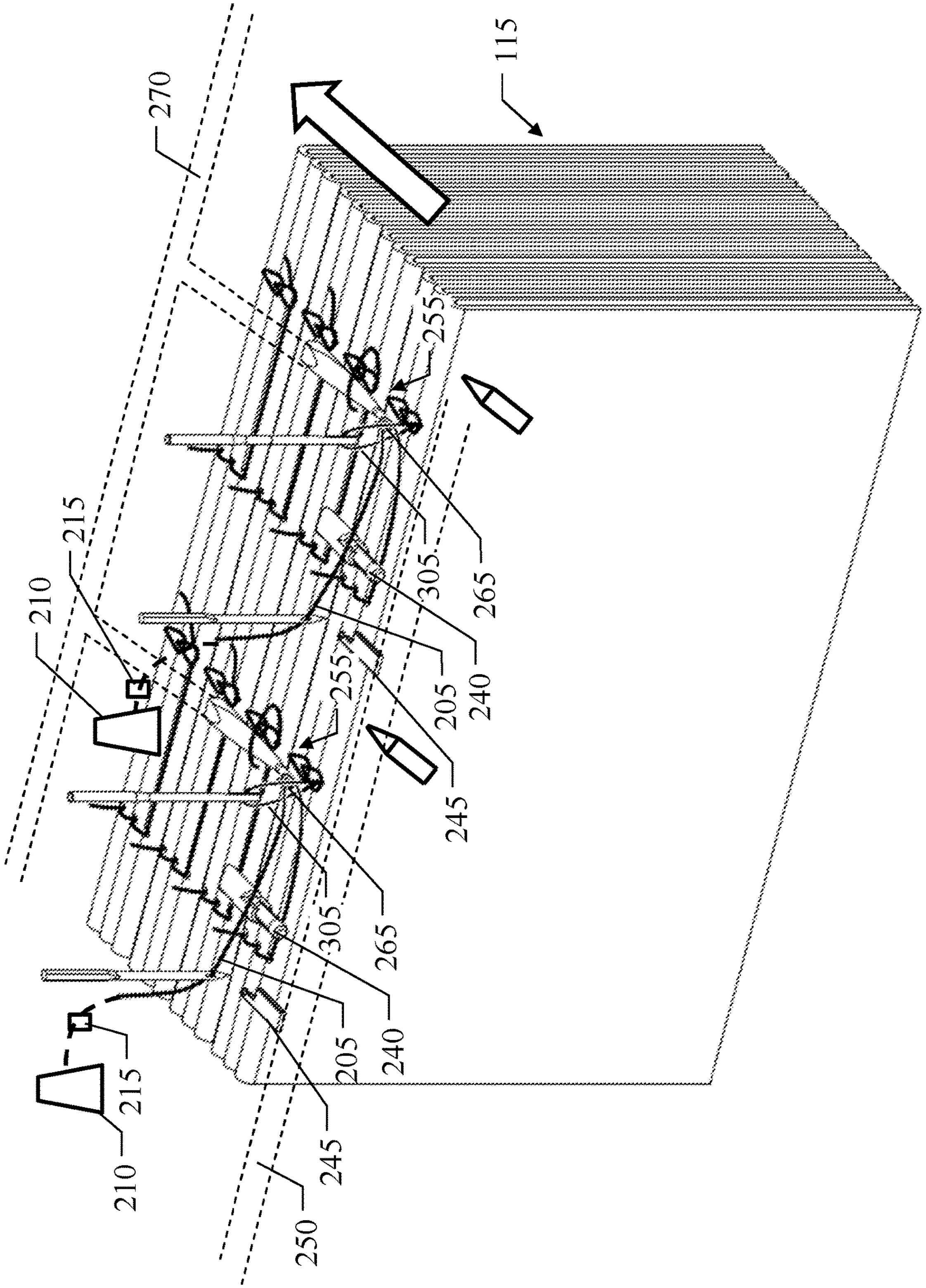

Passing to FIG. 3D, the support bar 270 translates the hooks 255 in the advancement direction of the signatures 115. At the same time, as soon as the hooks 255 have cleared their passage, the support bar 250 translates the shuttles 245 in the opposite direction to the above for bringing them back into their rest position (to the left in the figure), with each shuttle 245 thus releasing the corresponding thread 205. In this way, each hook 255 is extracted from the free loop 305 (behind it in the figure), for example, passing it by 1-3 mm. Consequently, the catch 265 of the hook 255 pulls the thread 205 (drawing it from the spool 210 with the thread-lock 215 being deactivated) to make it pass through the free loop 305 (from the catching position into a concatenation position). The double movement of the thread 205 (first obliquely and then along the advancement line of the signatures 115) allows the thread 205 to be inserted into the free loop 305 maintaining it in its normal position. At this point, for example, just before the hooks 255 exit the free loops 305, the thread-locks 215 are activated (to prevent further unwinding of the threads 205 from the spools 210). Furthermore, the cutters 240 are arranged for receiving the threads 205 to be cut later on. For example, in the case at issue the internal rod of each cutter 240 is extracted from its external bush, sliding in the opposite direction to the advancement direction of the signatures 115.

Figure 3E:
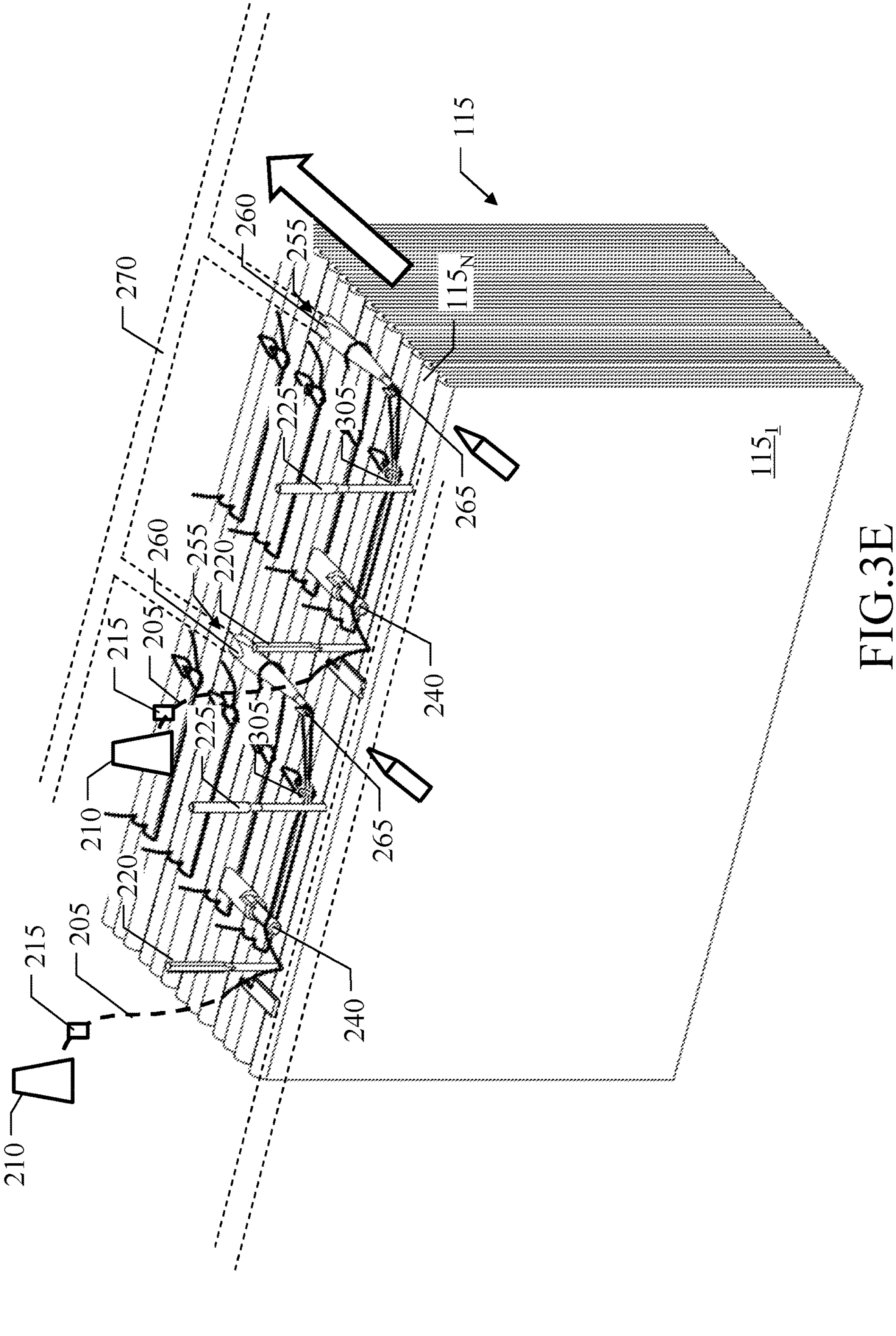

Moving to FIG. 3E, the operations described above are performed while the movable saddle (not shown in the figure) moves, that is, opens and closes, to bring a first signature of a next book block, differentiated with the reference $\mathbf{115}_1$, below the needles 220 and the crochets 225. The formation of the next book block is then started as described above. Particularly, the needles 220 and the crochets 225 are lowered so as to enter the (first) signature $\mathbf{115}_1$, thereby releasing the free loops 305 projecting from the signature $\mathbf{115}_N$; consequently, each thread 205 is unwound from the spool 210 (with the thread-lock 215 being deactivated), at the same time resting on the (extracted) internal rod of the cutter 240. At this point, the support bar 270 translates the hooks 255 transversely to the advancement line of the signatures 115. In this way, each hook 255 pulls the thread 205 (from the concatenation position to a closure position, the same as its rest position in the example at issue) away from the free loop 305 (to the opposite side of the corresponding needle 220 in this case, so as to facilitate the operation); during this movement of the hook 255, the thread 205 slides with respect thereto (and particularly with respect to its main body 260 in proximity to the catch 265). This operation takes place when the thread-locks 215 are deactivated, and therefore the threads 205 may unwind from the spools 210. Consequently, the portions of the thread 205 upstream and downstream of the hook 255 (along its feeding direction from the spool 210) offer corresponding resistances (upstream and downstream, respectively) to the pulling of the thread 205. Particularly, the upstream resistance (given by the friction for the passage of the thread 205 through the members between the spool 210 and the needle 220 and through the signature $\mathbf{115}_1$) is higher than the resistance downstream (given by the friction due to the passage of the thread 205 through the signature $\mathbf{115}_N$), for example, with the upstream resistance equal to 5-10 times the downstream resistance. Consequently, the hook 255 substantially pulls only the portion of the thread 205 downstream thereof, thereby tightening the free loop 305 around the thread 205 made to pass through it (with the sliding of the thread 205 with respect to the hook 255 that avoids that its portion upstream the hook 255 might tear). A stroke of the hooks 255 from the concatenation position to the closure position is set in such a way as to guarantee the closure of all the free loops 305 taking into account possible tolerances of their sizes, i.e., sufficient to close the largest possible free loops 305 (for example, for a distance approximately equal to the distance between each pair of adjacent needle 220 and crochet 225). Therefore, if some free loops 305 are smaller, each of them is closed before the corresponding hook 255 reaches its end of stroke (in an intermediate position close to the closure position). In this case, in the next (short) further movement of the hook 255 from the intermediate position to the closure position, the hook 255 now pulls the portion of the thread 205 upstream thereof, unwinding it from the spool 210 (with the sliding of the thread 205 with respect to the hook 255 that prevents its (tightened) portion downstream the hook 255 from being tom). For example, the hooks 255 reach their end of stroke just before the needles 220 and the crochets 225 reach their (deepest) dead point in the signature $\mathbf{115}_1$; this provides a good compromise between the opposing requirements of upstream resistance of the threads 205 being high (for closing the free loops 305 with less force) and being limited (for avoiding tearing the threads 205 after the closure of the free loops 305).

Figure 3F:
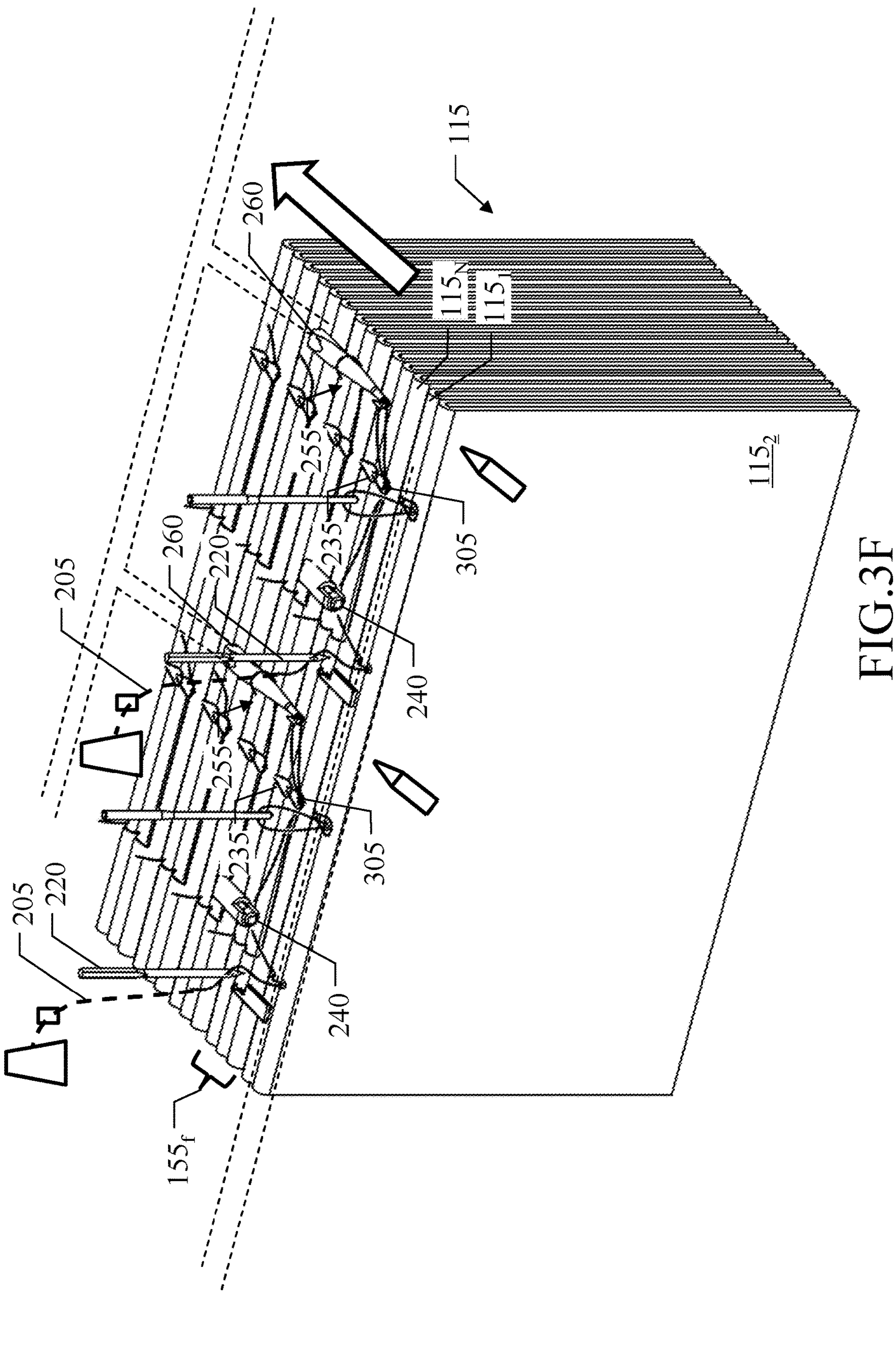

Moving to FIG. 3F, the formation of the next book block continues as described above. The cutters 240 are then operated to cut the threads 205, so as to separate the book block $\mathbf{155}_f$ (previously formed) from the next book block (under formation). For example, in the case at issue, the internal rod of each cutter 240 is retracted into its external bush, sliding in the advancement direction of the signatures 115, so as to cut the thread 205 resting thereon. This operation takes place after the sewing of a number of signatures 115 of the next book block sufficient to guarantee the compactness of its stitchings. For example, in the case of sewing with the normal stitching technique the threads 205 are cut after the sewing of a second signature of the next book block, differentiated with the reference $\mathbf{115}_2$, and before the sewing of any next signature (not shown in the figure), being either a third signature of the same next book block or the first signature of a further next book block; instead, in the case of sewing with the staggered sewing technique the threads 205 are cut after the sewing of a third signature of the next book block and before the sewing of any next signature (not shown in the figure), being either a fourth signature of the same next book block or the first signature of a further next book block. The cutters 240 are positioned at a distance from the corresponding needles 220 such as to obtain an optimal length of free tails of the threads 205 projecting from the signature $\mathbf{115}_1$ following their cutting (at the beginning of its plain stitches). For example, each cutter 240 is positioned so as to cut the thread 205 in a (cutting) position such as to obtain a free tail of the (cut) thread 205 that projects from the signature $\mathbf{115}_1$ with a length of 8-12 mm, preferably 9-11 mm, such as 10 mm (result that may be obtained by cutting the thread 205 at a distance from the signature $\mathbf{115}_1$, i.e., from the beginning of the corresponding plain stitches, of 12-16 mm, preferably 13-15 mm, such as 12-14 mm). The other free tails of the (cut) threads 205 projecting from the signature $\mathbf{115}_N$ each passes into the free loop 305, forms a loop wound around the hook 255 and returns into the free loop 305 (with the free loop 305 closed around the thread 205). The book block **155*r* moves continuously in the advancement direction of the signatures 115 following the formation of the next book blocks. Consequently, each thread 205 wrapped around the hook 255 is pulled towards the widest part of its main body 260. The loop of the free tail of the thread 205 (wrapped around the hook 255) is thus widened by pulling a free end of the free tail towards the free loop 305 until completely slipping out of it. In this way, the risk that the loop of the free tail of the thread 205 might exit from the free loop 305 is substantially reduced and the grip of the free loop 305 closed on the remaining part of the free tail of the thread 205 is further improved. The free tails of the threads 205** that thus remain projecting from the signature $\mathbf{115}_N$ may be subsequently sucked and cut as usual (by means of dedicated members, not shown in the figure).

The above-described solution makes it possible to avoid performing the blind stitch after the sewing of the last signature of each book block, thereby significantly increasing the performance of the sewing machine, especially in the case of small books (wherein each book block is formed by a small number of signatures); at the same time, a good withstanding is provided of the free loops being tight around the free tails of the cut threads, thereby avoiding (or at least substantially reducing) the risk that the stitchings might loosen during the next processing phases of the book blocks and therefore compromise their compactness and integrity.

This result is obtained in a simple way. Particularly, the use of passive elements (the hooks) makes the solution cost effective, reliable and with little, if no, maintenance (as the hooks do not substantially generate debris of the threads).

Furthermore, the above-described solution is particularly effective. In fact, the sliding of the threads with respect to the hooks during the closure of the free loops allows performing this operation before cutting the threads (without the risk of tearing them). In this way, the threads may be cut in any desired position, thereby forming corresponding free tails of optimal length (while the corresponding free tails projecting from the last signature of the just formed book block do not pose any problem as they may be sucked and cut as usual); for example, the length of the free tails may be chosen so as to avoid that they might return into the first signature of the book block, might be sewn by the needles in a next book block, might enter between two signatures of the book block and/or had to be cut.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as defacto equivalent to each other (but they are separate and autonomous entities). In any case, each numerical value should be read as modified according to applicable tolerances; particularly, unless otherwise indicated, the terms “substantially”, “about”, “approximately” and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for sewing signatures into book blocks in a bookbinding sewing machine. However, the method may be used in a bookbinding sewing machine of any type (see below) to sew signatures of any type (for example, simple, overlapped and so on) into book blocks of any type (for example, each comprising any number of signatures, with or without other elements such as inserts, and so on).

In an embodiment, the method comprises the following steps for each of the book blocks.

In an embodiment, the method comprises forming one or more stitchings between the signatures of the book block with corresponding sewing threads by means of one or more needles and one or more crochets. However, the needles and the crochets may form any number of stitchings with corresponding sewing threads of any type (for example, synthetic, natural, and so on).

In an embodiment, the stitchings comprise one or more rows of plain stitches formed by the needles and one or more rows of looped stitches formed by the crochets being concatenated to each other (the rows of looped stitches ending with corresponding free loops on a last one of the signatures of the book block). However, the stitchings may comprise any number of rows of plain stitches and rows of looped stitches (either the same or different), each comprising any number of corresponding stitches (either the same or different), which stitches may be formed in any way (for example, with the normal stitching technique, with the staggered stitching technique and so on).

In an embodiment, the method comprises bringing the sewing threads (upstream of the corresponding plain stitches along corresponding feeding directions of the sewing threads from corresponding spools) each to a catching position. However, the thread may be brought to the catching position in any way (for example, by pulling or pushing it, by means of a shuttle, an air jet and so on).

In an embodiment, the catching position is aligned with a corresponding one of the free loops (formed by the sewing thread) along an advancement line of the signatures during the sewing thereof. However, the free loop may be held by any one of the crochets being adjacent to the corresponding needle (for example, always towards the foot of the signatures, always towards the head of the signatures, alternatively towards the foot and towards the head of the signatures, and so on); moreover, the sewing thread may be brought to any catching position aligned with the free loop along the advancement line (for example, upstream or downstream of the free loop along the advancement direction of the signatures, at any distance from the free loop down to none and so on) in any way (for example, moving obliquely as the crow flies to form any angle different from 90° with the advancement line, along a non-linear or linear path, passing the free loop by any distance down to none and so on).

In an embodiment, the method comprises bringing the sewing threads each from the catching position to a concatenation position by passing the sewing thread through the corresponding free loop along the advancement line. However, the sewing thread may be brought to any concatenation position (for example, downstream or upstream of the free loop along the advancement direction of the signatures, to any distance beyond the free loop down to none and so on) in any way (for example, pulling or pushing it, with the same hook or independently of it, such as with a fork, an air jet and so on).

In an embodiment, the method comprises bringing the sewing threads each from the concatenation position to a closure position away from the corresponding free loop (thereby tightening the free loop around the sewing thread being passed therethrough). However, the sewing thread may be brought to any closure position (for example, at any distance from the free loop, either the same or different with respect to the corresponding rest position, and so on) in any way (for example, in any direction transversally to the advancement line, further along the advancement line, any combination thereof and so on).

In an embodiment, the sewing threads are brought from the concatenation position to the closure position by means of corresponding one or more hooks. However, the hooks may be of any type (for example, tapered, pointy, with uniform section, and so on).

In an embodiment, the sewing thread is free to slide relative to the corresponding hook during said bringing the sewing thread from the concatenation position to the closure position. However, the sewing thread may slide relative to the hook in any way (for example, around its main body, catch and so on).

In an embodiment, the method comprises cutting the sewing threads each upstream of a portion thereof being tightened by the corresponding free loop along the feeding direction. However, the sewing thread may be cut at any position upstream of this portion thereof and in any way (for example, with an active cutter, such as of telescope or scissor type, with a passive cutter, such as a blade on which the thread is tightened during the advancement of the signatures, with the cutter that is stationary to receive the thread or moves to take it, and so on).

In an embodiment, the sewing threads are cut after said bringing the sewing threads each from the concatenation position to the closure position. However, the sewing threads may be cut at any moment after being brought to the closure position (for example, as soon as the closure position is reached, with any non-null delay and so on).

Further embodiments provide additional advantageous features, which may however be omitted at all in a basic implementation.

In an embodiment, the method comprises cutting the sewing threads after the sewing of a plurality of signatures of a next one of the book blocks. However, this operation may be performed after the sewing of any number of signatures of the next book block, or even after the completion of any number of next book blocks (for example, when the book blocks are separated manually).

In an embodiment, said step of bringing the sewing threads each from the catching position to the concatenation position comprises moving the hooks each in a first direction of the advancement line thereby bringing the hook through the corresponding free loop to catch the corresponding sewing thread. However, the hook may be brought through the free loop in any way (for example, in the opposite direction to the advancement direction or in the same advancement direction of the signatures, to any distance beyond the sewing thread, for catching its upper portion or its lower portion, and so on).

In an embodiment, said step of bringing the sewing threads each from the catching position to the concatenation position comprises moving the hooks each in a second direction of the advancement line, opposite the first direction, thereby pulling the corresponding sewing thread to pass through the corresponding free loop. However, the hook may be moved for this purpose in any way (for example, in the advancement direction or in the opposite direction to the advancement direction of the signatures, to any distance beyond the free loop and so on).

In an embodiment, the first direction of the advancement line is an advancement direction of the signatures during the sewing thereof. However, dual considerations apply by reversing the directions.

In an embodiment, said step of bringing the sewing threads each from the concatenation position to the closure position comprises moving the hooks transversely to the advancement line. However, the hooks may be moved transversely to the advancement line in any way (for example, horizontally to the opposite side of or to the same side as the corresponding needles, vertically upwards or downwards, perpendicularly or obliquely to the advancement line, and so on).

In an embodiment, the signatures are sewn during consecutive sewing cycles seamlessly between each pair of consecutive book blocks. However, the possibility is not excluded of inserting a short (idle) pause between the sewing of each pair of consecutive book blocks (for example, when the sewing machine works at a very high speed).

In an embodiment, said step of bringing the sewing threads each to the catching position, said step of bringing the sewing threads each from the catching position to the concatenation position and said step of bringing the sewing threads each from the concatenation position to the closure position are performed between the sewing of the last signature of the book block and the sewing of a first one of the signatures of a next one of the book blocks. However, these steps may be performed within any phase of the sewing of the first signature of the next book block or even at other times (for example, before starting the sewing of the first signature of the next book block, within the sewing of two or more signatures of the next book block and so on).

In an embodiment, said step of bringing the sewing threads each from the concatenation position to the closure position is performed with the sewing threads free to unwind from the corresponding spools. However, the possibility is not excluded of performing this operation with the threads locked on the corresponding spools (for example, when there is no risk of tearing the threads, such as in the case of very accurate matching between the stroke of the hooks and the size of the free loops, of sufficiently elastic sewing threads, and so on).

In an embodiment, said step of bringing the sewing threads each from the concatenation position to the closure position is performed with the needles and the crochet inside the first signature of the next book block. However, the possibility is not excluded of performing this operation at another time (for example, with the needles and the crochet inside another signature of the next book block, outside any signature and so on).

In an embodiment, said step of bringing the sewing threads each from the concatenation position to the closure position is performed before the needles and the crochet reach a dead point in the first signature of the next book block. However, this operation may be performed at any time before the needles and the crochets reach their dead point, or even later on.

In an embodiment, corresponding upstream portions of the sewing threads (being upstream of the corresponding hooks along the feeding direction) pass through one or more members of the bookbinding sewing machine between the corresponding spools and needles. However, these members may be in any number and of any type (for example, partial, different and additional members with respect to the ones mentioned above).

In an embodiment, this causes the upstream portions to oppose an upstream resistance to said bringing the sewing threads each from the concatenation position to the closure position, the upstream resistance being higher than a downstream resistance that is opposed to said bringing the sewing threads each from the concatenation position to the closure position by corresponding downstream portions of the sewing threads being downstream of the corresponding hooks along the feeding direction. However, the upstream resistance and the downstream resistance may have any value (in either relative or absolute terms); in any case, the possibility is not excluded of having the upstream resistance of any other value (not null and in any case sufficient to allow the closure of the free loop, such as slightly lower than the downstream resistance, for example, by providing a next pulling of the thread towards the spool).

In an embodiment, the method comprises slipping off the sewing threads each by pulling a free end of the sewing thread outside the corresponding free loop being tightened around the sewing thread. However, this operation may be performed in any way (for example, only passively, with the addition of air jets or movements of the hooks that facilitate it, actively and so on) or even completely omitted.

In an embodiment, the hooks comprise corresponding main bodies with a tapered shape widening in an advancement direction of the signatures during the sewing thereof. However, the main bodies may have any tapered shape (for example, with any section, widening in any way, such as uniform/non-uniform, linear/non-linear and so on).

In an embodiment, corresponding portions of the sewing threads being wrapped around the main bodies of the hooks each is pushed along the main body of the corresponding hook in the advancement direction during said advancement of the signatures of the book block thereby causing said slipping off the sewing threads being cut. However, this result may be achieved in any way (for example, after the sewing of any number of next signatures, at the unloading of the book block from the sewing machine, with hooks of any type, even being not tapered, and so on).

In an embodiment, the method comprises blowing corresponding portions of the sewing threads wrapped around the hooks towards wider ends thereof. However, this result may be achieved in any way (for example, providing jets in any number, at any position, of any gas, such as air, de-ionized air, nitrogen, with any flow rate, in any direction according to the orientation of the hooks, either longitudinally or obliquely, and so on).

In an embodiment, the method comprises cutting the sewing threads to obtain corresponding free tails projecting from a first one of the signatures of a next one of the book blocks with a length of 8-12 mm. However, this result may be achieved by cutting the threads in different positions (according to their elasticity, tension and so on); in any case, the possibility is not excluded of having free tails of any other length (for example, with or without next sucking and/or cutting of the free tails at the end of the looped stitches, at the end of the plain stitches, of both of them and so on).

In an embodiment, the method comprises bringing the sewing threads to the catching position by means of corresponding one or more shuttles. However, the shuttles may be of any type (for example, pulling or pushing the sewing threads, and so on).

In an embodiment, the shuttles move as the crow flies obliquely to the advancement line. However, this movement may be of any type (for example, in broken line or straight line, forming any angle with the advancement line and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a bookbinding sewing machine for sewing signatures into book blocks. However, the sewing machine may be of any type (for example, opening preformed signatures, folding flat sheets to form the signatures, with both functions, for use in bookbinding plants based on offset or digital printing, and so on).

In an embodiment, the sewing machine comprises one or more spools for providing corresponding sewing threads. However, the spools may be in any number and of any type (for example, fixed, rotating, with or without thread-lock, thread-tension and so on).

In an embodiment, the sewing machine comprises one or more needles and one or more crochets for forming corresponding one or more stitchings between the signatures of each of the book blocks with the sewing threads, wherein the stitchings comprise one or more rows of plain stitches formed by the needles and one or more rows of looped stitches formed by the crochets being concatenated to each other, the rows of looped stitches ending with corresponding free loops on a last one of the signatures of the book block. However, the needles and the crochets may be in any number (either the same or different) and of any shape/size.

In an embodiment, the sewing machine comprises means for bringing the sewing threads, upstream of the corresponding plain stitches along corresponding feeding directions of the sewing threads from the corresponding spools, each to a catching position being aligned with a corresponding one of the free loops formed by the sewing thread along an advancement line of the signatures during the sewing thereof. However, these means may be implemented with any structure (for example, mechanical, pneumatic, with common or individual control, and so on).

In an embodiment, the sewing machine comprises means for bringing the sewing threads each from the catching position to a concatenation position by passing the sewing thread through the corresponding free loop along the advancement line. However, these means may be implemented with any structure (for example, mechanical, pneumatic, with common or individual control, and so on).

In an embodiment, the sewing machine comprises corresponding one or more hooks for bringing the sewing threads each from the concatenation position to a closure position away from the corresponding free loop thereby tightening the free loop around the sewing thread being passed therethrough, the sewing thread being free to slide relative to the corresponding hook during said bringing the sewing thread from the concatenation position to the closure position. However, the hooks may be of any type (see above) and driven in any way (for example, with common or individual control, and so on).

In an embodiment, the sewing machine comprises means for cutting the sewing threads each upstream of a portion thereof being tightened by the corresponding free loop along the feeding direction. However, these means may be implemented with any structure (for example, passive, active, with common or individual control, and so on).

In an embodiment, the means for cutting are configured for cutting the sewing threads after said bringing the sewing threads each from the concatenation position to the closure position. However, this result may be achieved in any way (for example, with means, implemented with any structure, such as an industrial PC, a microcontroller, a mechanism and the like, which operate active cutters accordingly, with passive cutters that provide the same result automatically and so on).

In any case, the same considerations of the above relating to the steps of the method apply mutatis mutandis to corresponding components of the bookbinding sewing machine.

An embodiment provides a bookbinding plant comprising one or more bookbinding sewing machines of the above. However, the bookbinding plant may comprise any number of such bookbinding machines and of other bookbinding machines of any kind, down to none (such as offset and/or digital printers, stacking machines, perfect binding machines, three-knife trimming machines and so on).

Generally, similar considerations apply if the sewing machine and the bookbinding plant each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for sewing signatures into book blocks in a bookbinding sewing machine, wherein for each of the book blocks the method comprises:

forming one or more stitchings between the signatures of the book block with corresponding sewing threads by means of one or more needles and one or more crochets, wherein the stitchings comprise one or more rows of plain stitches formed by the needles and one or more rows of looped stitches formed by the crochets being concatenated to each other, the rows of looped stitches ending with corresponding free loops on a last one of the signatures of the book block, bringing the sewing threads, upstream of the corresponding plain stitches along corresponding feeding directions of the sewing threads from corresponding spools, each to a catching position aligned with a corresponding one of the free loops formed by the sewing thread along an advancement line of the signatures during the sewing thereof, bringing the sewing threads each from the catching position to a concatenation position by passing the sewing thread through the corresponding free loop along the advancement line, bringing the sewing threads by means of corresponding one or more hooks each from the concatenation position to a closure position away from the corresponding free loop thereby tightening the free loop around the sewing thread being passed therethrough, the sewing thread being free to slide relative to the corresponding hook during said bringing the sewing thread from the concatenation position to the closure position, and cutting the sewing threads each upstream of a portion thereof being tightened by the corresponding free loop along the feeding direction, the sewing threads being cut after said bringing the sewing threads each from the concatenation position to the closure position.

2. The method according to claim 1, wherein the method comprises cutting the sewing threads after the sewing of a plurality of signatures of a next one of the book blocks.

3. The method according to claim 1, wherein said bringing the sewing threads each from the catching position to the concatenation position comprises:

moving the hooks each in a first direction of the advancement line thereby bringing the hook through the corresponding free loop to catch the corresponding sewing thread, and moving the hooks each in a second direction of the advancement line, opposite the first direction, thereby pulling the corresponding sewing thread to pass through the corresponding free loop.

4. The method according to claim 3, wherein the first direction of the advancement line is an advancement direction of the signatures during the sewing thereof.

5. The method according to claim 1, wherein said bringing the sewing threads each from the concatenation position to the closure position comprises:

moving the hooks transversely to the advancement line.

6. The method according to claim 1, wherein the signatures are sewn during consecutive sewing cycles seamlessly between each pair of consecutive book blocks, said bringing the sewing threads each to the catching position, said bringing the sewing threads each from the catching position to the concatenation position and said bringing the sewing threads each from the concatenation position to the closure position being performed between the sewing of the last signature of the book block and the sewing of a first one of the signatures of a next one of the book blocks.

7. The method according to claim 6, wherein said bringing the sewing threads each from the concatenation position to the closure position is performed with the sewing threads free to unwind from the corresponding spools and with the needles and the crochet inside the first signature of the next book block.

8. The method according to claim 7, wherein said bringing the sewing threads each from the concatenation position to the closure position is performed before the needles and the crochet reach a dead point in the first signature of the next book block.

9. The method according to claim 7, wherein corresponding upstream portions of the sewing threads, being upstream of the corresponding hooks along the feeding direction, pass through one or more members of the bookbinding sewing machine between the corresponding spools and needles thereby causing the upstream portions to oppose an upstream resistance to said bringing the sewing threads each from the concatenation position to the closure position, the upstream resistance being higher than a downstream resistance that is opposed to said bringing the sewing threads each from the concatenation position to the closure position by corresponding downstream portions of the sewing threads being downstream of the corresponding hooks along the feeding direction.

10. The method according to claim 1, wherein the method comprises:

slipping off the sewing threads being cut each by pulling a free end of the sewing thread outside the corresponding free loop being tightened around the sewing thread.

11. The method according to claim 10, wherein the hooks comprise corresponding main bodies with a tapered shape widening in an advancement direction of the signatures during the sewing thereof, corresponding portions of the sewing threads being wrapped around the main bodies of the hooks each being pushed along the main body of the corresponding hook in the advancement direction during said advancement of the signatures of the book block thereby causing said slipping off the sewing threads being cut.

12. The method according to claim 11, wherein the method comprises:

blowing corresponding portions of the sewing threads being wrapped around the hooks towards wider ends thereof.

13. The method according to claim 1, wherein the method comprises:

cutting the sewing threads to obtain corresponding free tails projecting from a first one of the signatures of a next one of the book blocks with a length of 8-12 mm.

14. The method according to claim 1, wherein the method comprises:

bringing the sewing threads to the catching position by means of corresponding one or more shuttles moving from a first point to a second point, a line between the first point and the second point extending obliquely to the advancement line.

15. A bookbinding sewing machine for sewing signatures into book blocks, wherein the sewing machine comprises:

one or more spools for providing corresponding sewing threads, one or more needles and one or more crochets for forming corresponding one or more stitchings between the signatures of each of the book blocks with the sewing threads, wherein the stitchings comprise one or more rows of plain stitches formed by the needles and one or more rows of looped stitches formed by the crochets being concatenated to each other, the rows of looped stitches ending with corresponding free loops on a last one of the signatures of the book block, means for bringing the sewing threads, upstream of the corresponding plain stitches along corresponding feeding directions of the sewing threads from the corresponding spools, each to a catching position being aligned with a corresponding one of the free loops formed by the sewing thread along an advancement line of the signatures during the sewing thereof, means for bringing the sewing threads each from the catching position to a concatenation position by passing the sewing thread through the corresponding free loop along the advancement line, corresponding one or more hooks for bringing the sewing threads each from the concatenation position to a closure position away from the corresponding free loop thereby tightening the free loop around the sewing thread being passed therethrough, the sewing thread being free to slide relative to the corresponding hook during said bringing the sewing thread from the concatenation position to the closure position, and means for cutting the sewing threads each upstream of a portion thereof being tightened by the corresponding free loop along the feeding direction, the means for cutting being configured for cutting the sewing threads after said bringing the sewing threads each from the concatenation position to the closure position.

16. A bookbinding plant comprising one or more bookbinding sewing machines according to claim 15.

* * * * *